Patented July 21, 1931

1,815,581

UNITED STATES PATENT OFFICE

GUSTAV PAUCKNER, OF LUDWIGSHAFEN-ON-THE-RHINE, AND RUDOLF HUETTNER, OF OPPAU, GERMANY, ASSIGNORS TO I. G. FARBENINDUSTRIE AKTIENGESELLSCHAFT, OF FRANKFORT-ON-THE-MAIN, GERMANY

PRODUCTON OF PHOSPHORIC ACID AND HYDROGEN

No Drawing. Application filed April 28, 1930, Serial No. 448,166, and in Germany May 13, 1929.

The present invention relates to the production of hydrogen and of oxygen acids of phosphorus, such as ortho-, meta- or pyrophosphoric acid.

It has already been proposed to convert phosphorus by means of water at elevated temperatures and under increased pressure into phosphoric acid and hydrogen.

We have now found that in such processes anhydrous or substantially anhydrous phosphoric acid may be employed with advantage instead of water. The reaction is carried out at temperatures of at least 250° C. and usually at between 250° and 500° C. The pressure is as a rule established by working in a closed vessel, in which the pressure is set up by the large amounts of gases and vapors present in the reaction vessel. As a rule, the pressure amounts to at least 20 atmospheres.

The advantages of this manner of working consists in the fact that a concentrated phosphoric acid rich in phosphorus pentoxide is directly obtained. The phosphoric acid so obtained has a higher content of phosphorus pentoxide than corresponds to anhydrous orthophosphoric acid (73.4 per cent of $P_2O_5$) and thus consists of a pyrophosphoric acid or metaphosphoric acid or a mixture of both with or without orthophosphoric acid. Any phosphorus hydride formed during the conversion may be converted according to any known and suitable methods into pure hydrogen and phosphoric acid.

Also the lower stages of oxidation of phosphorous than phosphoric acid, as for example anhydrous phosphorous acid may be converted with anhydrous phosphoric acid ito acids having a high content of phosphorus pentoxide and hydrogen in a manner similar to that hereinbefore described.

The acids formed may be readily converted into orthophosphoric acid of any concentration by the addition of water. A part of the acids obtained is preferably only diluted with water to such an extent that anhydrous orthophosphoric acid is obtained and this may then be employed for the conversion of further amounts of phosphorus.

The following examples will further illustrate the nature of this invention but the invention is not restricted to these examples. The parts are by weight.

Example 1

10 parts of yellow phosphorus are heated for 3 hours with 85 parts of crystalline phosphoric acid at 300° C. in a closed vessel, whereby a pressure of 83 atmospheres is set up. An acid containing 80 per cent of phosphorus pentoxide is obtained.

Example 2

10 parts of red phosphorus are heated for 2 hours with 85 parts of crystalline phosphoric acid at 300° C. in a closed vessel, whereby a pressure of about 49 atmospheres is set up. The acid obtained is of 77 per cent strength, calculated as $P_2O_5$.

Example 3

10 parts of crystalline phosphorous acid are heated for four hours in an autoclave with 300 parts of crystalline phosphoric acid at 320° C. and about 100 atmospheres pressure. A mixture of ortho- and pyro-phosphoric acids is obtained in addition to pure hydrogen.

What we claim is:—

1. The process of producing hydrogen and oxygen acids of phosphorus which comprises heating phosphorus with substantially anhydrous phosphoric acid under pressure.

2. The process of producing hydrogen and oxygen acids of phosphorus which comprises heating phosphorus with substantially anhydrous phosphoric acid under pressure to at least 250° C.

3. The process of producing hydrogen and oxygen acids of phosphorus which comprises heating phosphorus with substantially anhydrous phosphoric acid under a pressure of at least 20 atmospheres to at least 250° C.

4. The process of producing hydrogen and oxygen acids of phosphorus which comprises heating phosphorus with substantially anhydrous phosphoric acid under a pressure of at least 20 atmospheres to a temperature between about 250° and 500° C.

In testimony whereof we have hereunto set our hands.

GUSTAV PAUCKNER.
RUDOLF HUETTNER.